US011537494B2

(12) United States Patent
Zotto

(10) Patent No.: US 11,537,494 B2
(45) Date of Patent: Dec. 27, 2022

(54) PREDICTED USAGE BASED ON MONITORED USAGE

(71) Applicant: Hewlett-Packard Development Company, L.P., Spring, TX (US)

(72) Inventor: Rafael Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,418

(22) PCT Filed: Jul. 16, 2018

(86) PCT No.: PCT/US2018/042259
§ 371 (c)(1),
(2) Date: Oct. 14, 2020

(87) PCT Pub. No.: WO2020/018063
PCT Pub. Date: Jan. 23, 2020

(65) Prior Publication Data
US 2021/0141707 A1 May 13, 2021

(51) Int. Cl.
*G06F 11/34* (2006.01)
*G06F 11/30* (2006.01)
(Continued)

(52) U.S. Cl.
CPC ...... *G06F 11/3438* (2013.01); *G06F 11/3006* (2013.01); *G06F 21/31* (2013.01); *H04L 67/535* (2022.05)

(58) Field of Classification Search
CPC ...... G06F 11/30; G06F 11/34; G06F 11/3006; G06F 11/3438; G06F 9/46; G06F 21/31;
(Continued)

(56) References Cited

U.S. PATENT DOCUMENTS

2006/0156209 A1* 7/2006 Matsuura .......... H04M 1/72472
714/E11.207
2009/0164395 A1 6/2009 Heck
(Continued)

FOREIGN PATENT DOCUMENTS

EP 2221719 A1 8/2010

OTHER PUBLICATIONS

Florian Schmidt et.al, Representation Learning for Resource Usage Prediction, Feb. 2, 2018, SysML'18, Stanford, CA, USA, 3 pgs.
(Continued)

*Primary Examiner* — James N Fiorillo
(74) *Attorney, Agent, or Firm* — Quarles & Brady LLP

(57) ABSTRACT

Example implementations relate to predicted usage based on monitored usage. For example, a system comprising a monitor engine can monitor usage of a plurality of applications used by a user during a first time period, during a heartbeat event, and predict usage of the plurality of applications, using a predictor engine, by the user during a second time period based on the analyzed monitored usage of the plurality of applications during the first time period. Additionally, the predictor engine can generate content during the second time period based on the predicated usage of the plurality of applications during the first time period.

14 Claims, 4 Drawing Sheets

(51) Int. Cl.
G06F 21/31 (2013.01)
H04L 67/50 (2022.01)

(58) Field of Classification Search
CPC .............. G06F 12/0862; G06F 11/302; G06F 11/3055; G06F 11/3495; G06F 9/50; G06F 9/4881; G06F 9/44505; H04L 67/22; H04L 43/00; H04L 29/08; G06Q 30/00; G06N 5/04
USPC ........................................................ 709/127
See application file for complete search history.

(56) References Cited

U.S. PATENT DOCUMENTS

| | | | |
|---|---|---|---|
| 2010/0083248 A1* | 4/2010 | Wood ................ G06F 9/45558 | 718/1 |
| 2012/0023226 A1* | 1/2012 | Petersen ............ H04L 67/2876 | 709/224 |
| 2014/0032468 A1 | 1/2014 | Anandaraj | |
| 2015/0127819 A1* | 5/2015 | Cimino ................ H04L 67/125 | 709/224 |
| 2015/0254560 A1* | 9/2015 | Laredo .................... G06F 9/542 | 706/46 |
| 2015/0356581 A1* | 12/2015 | Litmanovich ......... H04L 67/306 | 705/7.33 |
| 2016/0004971 A1* | 1/2016 | Verkasalo ................ G06N 5/04 | 706/12 |
| 2016/0112272 A1* | 4/2016 | Li ....................... H04L 67/1031 | 709/223 |
| 2016/0189049 A1* | 6/2016 | Silvestri ................ G06N 20/00 | 706/52 |
| 2016/0360382 A1* | 12/2016 | Gross ...................... G06F 3/016 | |
| 2017/0242731 A1* | 8/2017 | Xie ........................ G06F 9/5027 | |
| 2020/0019485 A1* | 1/2020 | Moradi .............. G06F 9/44505 | |
| 2020/0057721 A1* | 2/2020 | Tian ................... G06F 12/0862 | |
| 2020/0145506 A1* | 5/2020 | Dintenfass ............ H04L 67/535 | |

OTHER PUBLICATIONS

Jung-Jin Lee et al., Learning and predicting user behavior for particular resource use, 2001, FLAIRS—01 Proceedings, American Association for Artificial Intelligence, 5 pgs.

* cited by examiner

PREDICTED USAGE BASED ON MONITORED USAGE

BACKGROUND

Computer technologies can monitor resource usage to collect data from users. Usage monitoring can be done using hardware and software.

DETAILED DESCRIPTION

Figure 1:
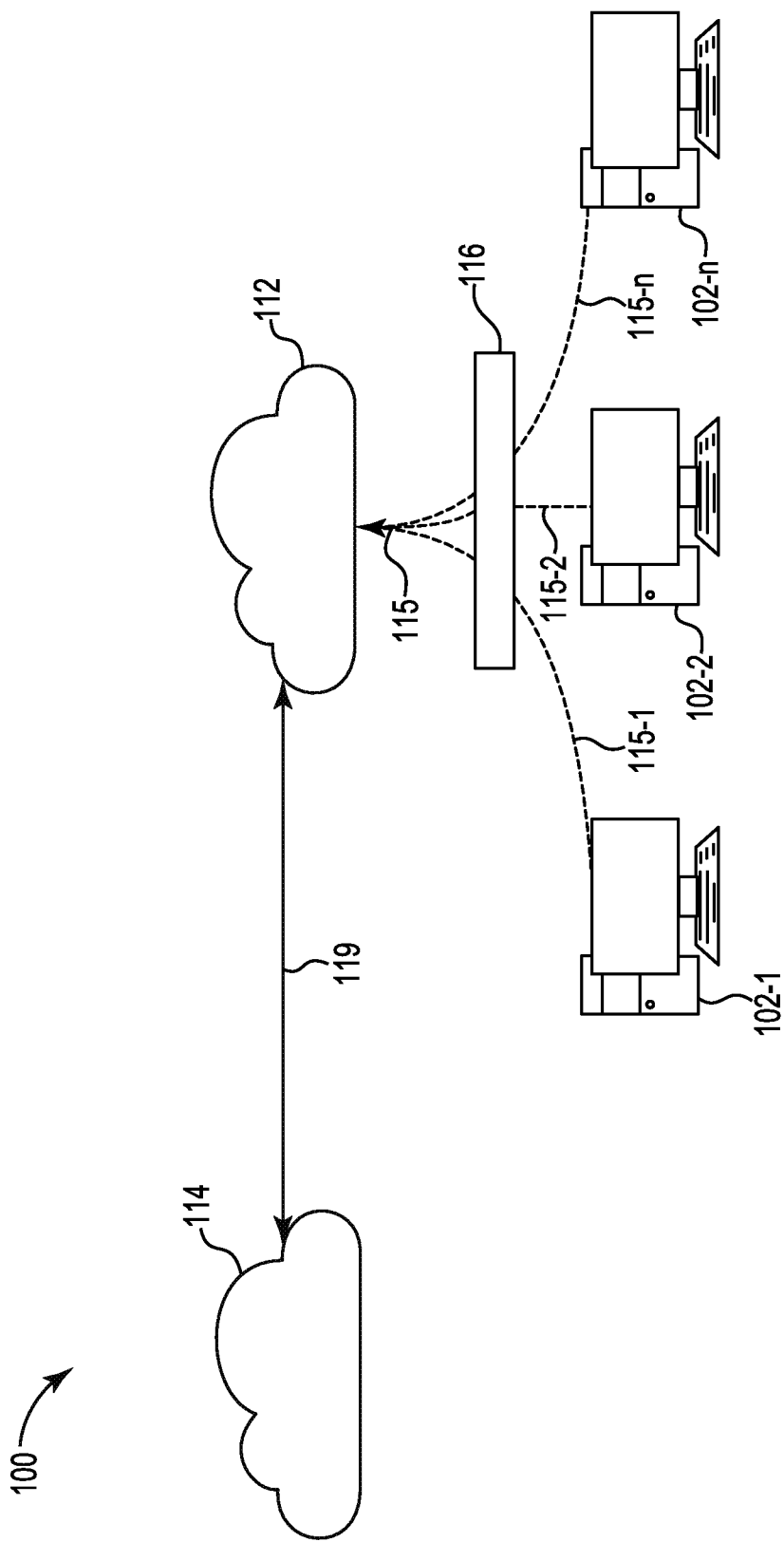
FIG. 1 illustrates an example system for predicted usage according to the present disclosure.

Computer systems can monitor and analyze usage data of a user. For instance, computer systems can have protocols to access and monitor usage data and allocate data sources to support user activities, provide accurate equipment recommendations, and provide faster computer applications. However, such tasks may be deterministic and may not directly benefit a user by individualizing his or her specific preferences based on usage data by preloading them automatically when the user accesses the computer systems.

For instance, in some prior approaches, computer systems can map computer operations into a flowchart diagram which can then be implemented as a computer program. This flowchart diagram may position the tasks that should be performed, in the order that they have to be executed, together with any decisions that have to be made along the way. The flowchart can be utilized for processes where decisions are made on unambiguous data and computer resources are allocated based on that data.

In at least one example, a user can benefit from a system that would execute and predict user's software usage pattern based on probability. For example, a user can benefit from having his or her commonly used content (e.g., software application) preloaded and running during a given time period based on the user's prior usage. For example, a user can have access to multiple computer systems, and have commonly used software applications that the user uses during a time period. A system can learn the user's usage pattern by collecting data at a given interval for a period of time. The system can then predict the user's usage of those applications, and preload them automatically when the user access's the computer systems. In some examples, the system can allocate content prior to the user requesting them based on the monitored usage.

Accordingly, the description herein is directed to predicted usage based on monitored usage. For example, a computer system and/or an apparatus can monitor usage of a plurality of applications used by a user during a first time period, analyze the monitored usage, and predict usage of the plurality of applications by the user during a second time period based on the analysis of the monitored usage during the first time period. In some examples, monitoring usage of the plurality of applications can include analyzing the monitored usage during a particular time interval, determining a frequency of signal generated by the usage, and generating information to elect applications based on the frequency of signal. As described herein, the term "elect" refers to selecting applications based on the monitored usage. For example, if monitor engine 112 determines the user used an application 15 times in a certain week, the monitor engine 112 can elect that over an application that the user used 10 times during the same time period. Further, the monitor engine 112 can determine the time of day that the user used the application 15 times during the same time period. Predicting what software, tool, and/or action will be executed next, the system can prepare itself in advance. This can provide an improved user experience and allow the system to automatically organize itself to offer particular services.

In some examples, monitored information can be used to infer the availability of a user in a given timeframe of the day. For example, if the system monitors that a particular user has checked for news or social network content in a given period of time, the system can predict such behavior and can suggest to a meeting organizer to meet during the given period of time. In one example, if an employee is using content associated with a particular work project (e.g., programming), the system can predict that the employee is busy, and send a message indicating such to people trying to contact him or her. In some examples, content can be generated during the second time period based on the predicated usage of the plurality of applications during the first time period.

FIG. 1 illustrates an example system 100 for predicted usage according to the present disclosure. System 100 can include a monitor engine 112, and a predictor engine 114, a heartbeat event 116, and a plurality of computer terminals 102-1, 102-2, . . . , 102-n (hereinafter referred to collectively as 102). In at least one example, monitor engine 112 monitors and analyzes monitored usage of a plurality of applications during a first time period. In at least one example, predictor engine 114 predicts usage of the plurality of applications during a second time period based on the monitored usage. In some examples, a user can be at a first computer terminal 102-1, at a second computer terminal 102-2, and a third computer terminal 102-n. Usage can be monitored during a heartbeat event 116. As described herein, the term "heartbeat event" refers to a periodic signal generated by a system's hardware and/or software to indicate normal operation, and/or to synchronize other parts of the system. In some examples, usage data from the plurality of computer terminals 102 can be analyzed by monitor engine 112 in response to portions of data 115-1, 115-2, 115-n (hereinafter referred to collectively as 115) being received by the monitor engine 112 during a heartbeat event 116. As an example, a first portion of data 115-1 can be received from computer terminal 102-1 and be sent to the monitor engine 112, a second portion of data 115-2 can be received from computer terminal 102-2 and be sent to the monitor engine 112, and so forth.

As described herein, the term "monitor engine" refers to a centralized repository that receives and monitors all structured and unstructured usage data at any scale. In one example, monitor engine 112 can store usage data as-is, without having to first structure the data, and run different types of analytics. In some examples, monitor engine 112 can monitor data received from dashboards and visualizations and categories based on predefined category. In at least one example, monitor engine 112 can include hardware and/or firmware used to process the received data. As described herein, the term "predictor engine" refers to a group of networked elements providing services to monitor the system's activities. In some examples, predictor engine 114 can be a cloud computing platform.

In at least one example, monitor engine 112 can monitor usage of a plurality of applications used by a user during a first time period. In some examples, monitor engine 112 can monitor usage of the plurality of applications used by a user at the first computer terminal 102-1. For example, monitor engine 112 can monitor, during the first time period, that the user arrives at and turns on the computer at a time of 7:30 AM, checks a company email at 7:35 AM using a computer program and/or application (e.g., email application), checks a personal email at 7:40 AM using a computer program and/or application (e.g., web browsing), opens a computer program and/or application (e.g., social media) at 7:45 AM, opens a computer program and/or application (e.g., word processing applications) and starts performing a work function (e.g., programming) at 8:00 AM, joins a daily team meeting via a teleconferencing program and/or application (e.g., conferencing), and is inactive from 12:00 PM to 1:00 PM.

In some examples, monitor engine 112 can monitor user usage of the plurality of applications for a first period of time. In some examples, the first period of time can be five working days. Monitor engine 112 can analyze the monitored usage during that five working day period and determine a frequency of signal generated by the usage of the applications. As described herein, the term "frequency of signal" refers to the number of occurrences of a repeating event per unit of time. Frequency of signal can be proportional to the number of applications being used. For example, if the system 100 monitors five applications being used by a user in five hours, the frequency of signal can be 1. Similarly, if the system 100 monitors 10 applications being used by the user in five hours, the frequency of signal can be 2. In some examples, the motor engine 112 can generate information to elect applications based on the frequency of signal of the applications.

In some examples, system 100 can preload the plurality of applications (e.g., e-mail, web browsing, social media, programming, and video conferencing) for the user during a second time period based on the usage of the plurality of applications during the first time period. As used herein, the term "preload" refers to loading applications at a time prior to the time a user uses the application. For example, the system 100 can monitor and determine, based on the monitored usage during the first week of July, the user using email via an email application at 8:00 AM, and social media browser at 8:30 A.M. In response to the monitored usage, the system 100, during the second week of July, can preload an email application at 7:45 AM and and the social media browser at 8:15 AM, prior to the time the user opening the named applications at 8:00 AM and 8:30 AM. In some examples, in response to the user logging into the second computer terminal 102-2, the plurality of applications (e.g., e-mail, web browsing, social media, programming, and conferencing) used by the user on the first computer terminal 102-1 can be preloaded onto the second computer terminal 102-2. The preloaded applications can be displayed on a monitor for ease of access for the user. The preloaded applications can be displayed on a computer display, a mobile device display, a wearable device display, and/or a combination thereof.

In some examples, system 100 can use monitor engine 112 to monitor usage of the plurality of applications during a first time period by a first user using the first computer terminal 102-1 as described herein. Monitor engine 112 can monitor usage using a heartbeat event 116. The heartbeat event 116 of system 100 can be used to determine when to analyze usage during a particular time interval. In one example, the heartbeat event 116 can analyze usage at a thirty second time interval. In one example, the heartbeat event can analyze usage at a sixty second time interval. The time interval at which the heartbeat event 116 analyzes the monitored usage can be determined by system 100 based on the frequency of signal received.

Usage can be monitored during the heartbeat event 116 by determining the frequency of signal generated by the plurality of applications. For example, the heartbeat event 116 can determine applications such as web browsing, social media, programming, and video conferencing being used by the user during a 120 second time interval. Based on that information, heartbeat event 116 can determine the frequency of signal to be the number of applications being used in the 120 second time interval. In some examples, heartbeat event 116 can determine the frequency of signal by counting the number of times an event occurs within a specific time period, and dividing the count by the length of the time period. For example, the heartbeat event 116 can determine that an application (e.g., email application) is being used 120 times in 60 minutes. Based on this, the heartbeat event 116 can determine the frequency of signal to be 2. Based on the determined frequency of signal, the monitor engine 112 can generate information to elect applications for the user.

In some examples, system 100 can trigger an initiation of the heartbeat event 116 at a specified time interval to determine the usage of the plurality of applications in real time. For example, system 100 can trigger an initiation of the heartbeat event 116 during a particular number of days of the week, such as from Monday through Thursday, to determine the user's usage of the plurality of applications, System 100 can use the user's actual usage time during which one or more processes or events are occurring to determine the usage of the plurality of applications.

In some examples, system 100 can trigger an initiation of the heartbeat event 116 in response to determining a new activity by at least one user. For example, system 100 can trigger, via monitor engine 112, a heartbeat event 116 as the system 100 determines an existing user initiated a new activity. Similarly, system 100 can trigger, via a monitor engine 112, a heartbeat event 116 as the system determines a new user. In some examples, an existing and/or a new user can be identified via an authentication process.

Monitor engine 112 can generate information based on the frequency of signal information determined by the heartbeat event 116. In one example, the monitor engine 112 can elect three applications based on the frequency of signal determined, as described herein. In one example, the elected applications can vary from week to week based on the frequency of signal analyzed by the heartbeat event 116. For example, monitor engine 112 can generate information to elect two applications during a first week of July based on a frequency of signal generated during last week of June. Similarly, monitor engine 112 can generate information to elect four applications during the second week of July based on a frequency of signal generated during the first week of July. In some examples, the elected applications can be manually altered by the user. For example, a user can manually alter information to elect applications based on the user's preferred applications for a given time period. The monitored usage during the first time period can be analyzed by the predictor engine 114.

In some examples, the monitor engine 112 can generate a usage log at a start of the first time period. For example, monitor engine 112 can generate a usage log in response to an existing user using the system 100, and collect data regarding at least one of browsing activity, visited websites, downloaded files, software used during a session; etc. In some examples, monitor engine 112 can generate a usage log in response to a new user using the system 100, and collect data regarding browsing activity, visited websites, downloaded files, software used during a session. In some examples, usage logs can log during a period of time using a time log. In some examples, data retrieved from the usage log can provide a real-time 24/7 view into performance of applications and usage across various devices used by the user. In some examples, the usage log can provide information to the predictor engine 114. Based on the information generated and provided by the usage log, the predictor engine 114 can suggest an alternate application.

Predictor engine 114 can analyze the monitored usage of the plurality of applications by monitor engine 112, as described herein. In some examples, predictor engine 114 can analyze data by processing and modeling data received from monitor engine 112. In some examples predictor engine 114 can perform data mining to analyze data. In some examples, predictor engine 114 can use analytics to analyze data received from monitor engine 112. Based on the analysis, the predictor engine 114 can predict usage of the plurality of applications by the user during a second time period.

Predictor engine 114 can perform statistical modeling of the monitored data usage to predict and/or classify the monitored usage to predict usage during the second time period. The second time period can be a future time period with respect to the first time period. In some examples, the second time period can be a particular period of time, e.g., a few hours, after or in the future of the first time period. In some examples, the second time period can be a few days from the first time period.

In some examples, predictor engine 114 can generate existing content during the second time period based on existing resources. For example, predictor engine 114 can preload existing applications (e.g., word processing application, conferencing application, etc.) during the second time period based on the applications installed and used during the first time period.

In some examples, predictor engine 114 can generate content during the second time period based on the predicated usage of the plurality of applications during the first time period. In some examples, content can include web pages, images, audio and video information, etc. In some examples, the user can retrieve the content generated during the second time period at a later time.

Figure 2:
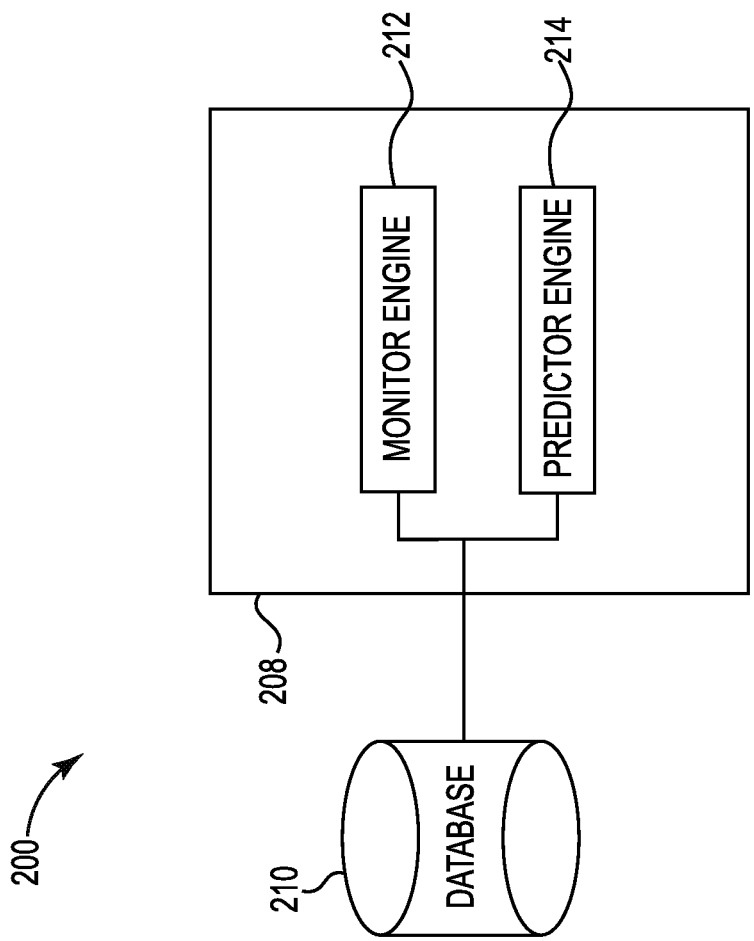
FIG. 2 illustrates an example system for predicted usage according to the present disclosure.

FIG. 2 illustrates an example of a system 200 for predicted usage according to the present disclosure. The system 200 can include a plurality of engines, such as a monitor engine 212 and a predictor engine 214. The system 200 can include additional or fewer engines than are illustrated to perform the various elements as described in association with FIG. 1.

Figure 3:
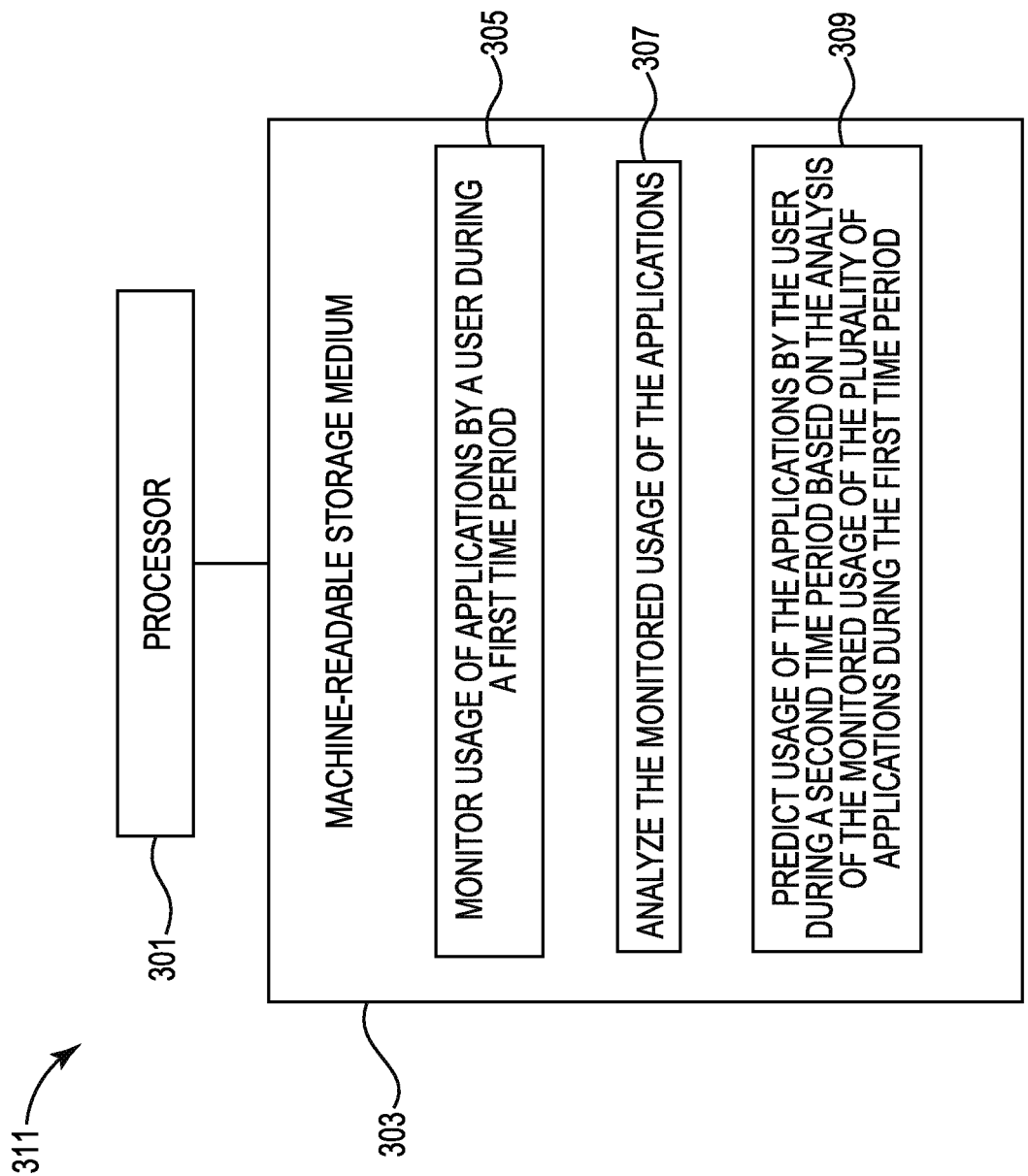
FIG. 3 illustrates a block diagram of an example system for predicted usage according to the present disclosure.

The plurality of engines (e.g., monitor engine 212, predictor engine 214) can include a combination of hardware and machine-readable instructions (e.g., stored in a memory resource, such as a non-transitory machine readable medium 303 illustrated in FIG. 3) that are executable using hardware components such as a processor, but at least hardware, to perform elements described herein (e.g., analyzing the monitored usage during a particular time interval, determining a frequency of signal generated by the usage of the plurality of applications, etc.)

The monitor engine 212 can include hardware and/or a combination of hardware and machine-readable instructions, but at least hardware, to receive an input from a user in response to the user using one or more applications. In some examples, the input can come from a user using a computer device, a wearable device, a mobile device, among other types of devices.

The predictor engine 214 can include hardware and/or a combination of hardware and machine-readable instructions, to cause the system to analyze and predict usage of the plurality of applications by the user during a second time period based on the analysis of the monitored usage of the plurality of applications. The predicted applications can be displayed on a monitor. The display can include a computer display, a mobile device display, a wearable device display, among other types of devices. The predictor engine 214 can generate content during the second time period based on the predicated usage of the plurality of applications during the first time period.

FIG. 3 illustrates a block diagram of a system 311 for predicted usage according to the present disclosure. In the particular example shown in FIG. 3, system 311 includes a processor 301 and a machine-readable storage medium 303. The machine-readable storage medium 303 can be a non-transitory machine-readable storage medium. Machine-readable storage medium 303 can include instructions 305, 307, 309 that, when executed via processor 301, perform monitoring, analyzing, and/or predicting. Although the following descriptions refer to an individual processor and an individual machine-readable storage medium, the descriptions can also apply to a system with multiple processing resources and multiple machine-readable storage mediums. In such examples, the instructions can be distributed across multiple machine-readable storage mediums and the instructions can be distributed across multiple processing resources. Put another way, the instructions can be stored across multiple machine-readable storage mediums and executed across multiple processing resources, such as in a distributed computing environment.

Processor 301 can be a central processing unit (CPU), microprocessor, and/or other hardware device suitable for retrieval and execution of instructions stored in machine-readable storage medium 303. In the particular example shown in FIG. 1, processor 301 can execute monitor, analyze, and/or predict instructions 305, 307 and 309. As an alternative or in addition to retrieving and executing instructions, processor 301 can include an electronic circuit comprising a number of electronic components for performing the operations of the instructions in machine-readable storage medium 303. With respect to the executable instruction representations or boxes described and shown herein, it should be understood that part or all of the executable instructions and/or electronic circuits included within one box can be included in a different box shown in the figures or in a different box not shown.

Machine-readable storage medium 303 may be any electronic, magnetic, optical, or other physical storage device that stores executable instructions. Thus, machine readable storage medium 303 may be, for example, Random Access Memory (RAM), an Electrically-Erasable Programmable Read-Only Memory (EEPROM), a storage drive, an optical disc, and the like. The executable instructions may be "installed" on the system 311 illustrated in FIG. 3. Machine-readable storage medium 303 may be a portable, external or remote storage medium, for example, that allows the system 311 to download the instructions from the portable/external/remote storage medium. In this situation, the executable instructions may be part of an "installation package". As described herein, machine-readable storage medium 303 may be encoded with executable instructions related to alerts of virtual reality devices. That is, using processor 301, machine-readable storage medium 303 can cause a system to monitor usage of applications during a first time period and predict usage of applications during a second time period, among other operations.

System 311 can include instructions 303. Instructions 305, when executed by the processor 301, can cause monitoring of the usage of a plurality of applications used by a user during a first time period based on frequency of signal generated by the plurality of applications.

In some examples, at 303, system 311 can include a monitor engine (e.g., monitor engine in 112 in FIG. 1) to monitor usage of a plurality of applications used by a user. For example, a monitor engine can monitor, during the first time period, that the user arrives and turns on the computer at 7:30 AM, checks company email at 7:35 AM using an email application, checks personal email at 7:40 AM using web browsing, opens social media at 7:45 AM, opens word processing and starts programming at 8:00 AM, joins a daily team meeting via conferencing, and is inactive from 12:00 PM to 1:00 PM. In some examples, the monitor engine can monitor user usage of the plurality of applications for a first period of time. In some examples, the first period of time can be five working days.

In some examples, instruction 305 can be executed to cause the system 311 to monitor the usage during a heartbeat event. A heartbeat can analyze usage during a particular time interval. During the heartbeat event, system 311 can determine a frequency of signal generated by the usage of the plurality of applications. In some examples, instruction 305 can be executed to cause the system 311 to generate information to elect applications based on the frequency of signal.

System 311 can include instruction 307. Instruction 307, when executed by the processor 301, can cause the system 311 to analyze the monitored usage of the plurality of applications.

In some examples, at 307, system 311 can include a predictor engine (e.g., predictor engine in 114 in FIG. 1) to analyze the monitored usage of the plurality of the applications based on the information received from monitored usage of the applications during the first time period. In some examples, the system 311 can verify the user of the first time period, via an authentication process. The authentication information can be used to verify the user as the user of the first time period during the second time period to predict usage for the user of the first time period.

System 311 can include instruction 309. Instruction 309, when executed by the processor 301, can cause the system 311 to predict usage of the plurality of applications by the user during a second time period based on the frequency of signal. In some examples, at 309, system 311 can include a predictor engine (e.g., predictor engine in 114 in FIG. 1) to predict usage of the plurality of applications by the user during a second time period based on the frequency of signal. In some examples, a frequency of signal can be determined based on monitoring usage of the plurality of applications during a particular time interval. In some examples, a time interval can be a week. In some examples, a time interval can be five working days.

In some examples, system 311 can generate the content in the second time period. In at least one example, generating the content can include providing existing content during the second time period based on the predicted usage. In some examples, the content can include documents including images, texts, among other things, associated with at least one of the plurality of applications. In some examples, content can include an additional application, and/or an application providing similar functionality to at least one of the plurality of applications. In some examples, system 311 can determine the usage of the plurality of applications based on a set of determined criteria.

In at least one example, the system 311 can include additional instructions, when executed by the processor 301, that can cause the system 311 to analyze additional monitored usage. The additional monitored usage can include the generated content. As an example, subsequent to providing the generated content to the user, additional usage by the user including the generated content can be used to generate additional content. In this way, a feedback loop can be used to continually update the predicted usage of the user to provide subsequent generated content.

Figure 4:
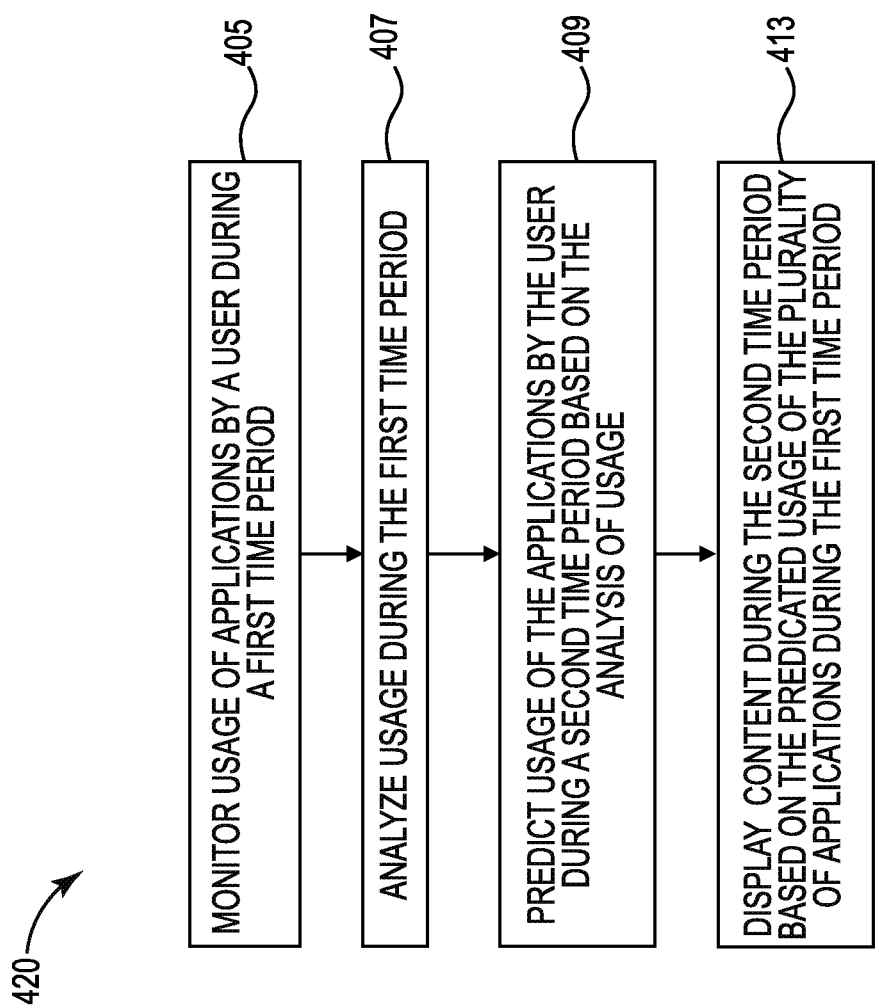
FIG. 4 illustrates a diagram of an example method for predicted usage according to the present disclosure.

FIG. 4 illustrates a diagram of a method 420 for predicted usage according to the present disclosure. In some examples, method 420 can be performed with a system, such as system 100 illustrated in FIG. 1. In some examples, a system can include a computing device and/or controller that includes instructions to be executed to perform the method 420.

At 405, method 420 can include monitoring usage of a plurality of applications by a user during a first time period. In some examples, method 420 can include a monitor engine (e.g., monitor engine in 112 in FIG. 1) to monitor usage of a plurality of applications used by the user during a first time period. In some examples, monitoring usage of the plurality of application during the first time interval can include analyzing the monitored usage during a particular time interval, determining a frequency of signal generated by the usage, and generating information to elect applications based on the frequency of signal.

At 407, method 420 can include analyzing usage during the first time period. In some examples, a heartbeat event (e.g., heartbeat event 116 in FIG. 1) can include analyzing usage during a particular time interval. In some examples, via the heartbeat event, a system can determine a frequency of signal generated by the usage of the plurality of applications.

At 409, method 420 can include predicting future usage of the plurality of applications by the user during a second time period based on the analysis of usage. In some examples, method 420 can include a predictor engine (e.g., predictor engine in 114 in FIG. 1) to predict usage of the plurality of applications by the user during a second time period based on the frequency of signal. In some examples, a frequency of signal can be determined based on monitoring usage of the plurality of applications during a particular time interval. In some examples, a time interval can be a week. In some examples, a time interval can be five working days. In some examples, predicting the future usage of the plurality of applications comprises analyzing contextual information. Contextual information can include a date, a time, a duration of usage, and/or combinations thereof.

In some examples, method 420 can generate the content in the second time period. In some examples, the content can generate and/or provide existing documents including images, texts, among other things, associated with at least one of the plurality of applications. In some examples, content can include an additional application, and an application providing similar functionality to at least one of the plurality of applications. In some examples, the method can determine the usage of the plurality of applications based on a set of determined criteria.

At 413, method 420 can include displaying content on a display during a second time period based on the predicted future usage of the plurality of the applications. In some examples, method 420 can dispose the content generated during the second time period based on the predicted future usage of the plurality of the applications. In some examples, disposing the content can remove the content from display and/or reallocate computer hardware resources.

As used herein, "a", "an", or "a number of" something can refer to one or more such things, while "a plurality of" something can refer to more than one such thing. For example, "an aperture" can refer to one or more apertures, while a "plurality of pockets" can refer to more than one pocket.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure and should not be taken in a limiting sense,

What is claimed is:

1. A system comprising:
    a monitor engine to monitor usage of a plurality of applications used by a user during a series of heartbeat events that occur during a first time period, each of the heartbeat events having a predetermined time interval wherein usage is monitored during each heartbeat event over the first time period by:
    analyzing the monitored usage during the predetermined time interval;
    determining a frequency of signal generated by the monitored usage of the plurality of applications, wherein the frequency of signal comprises a number of occurrences and time of usage for each application during the first time period, and is measured in proportion to the number of applications being monitored; and
    generating information to elect one application over another application applications based on the frequency of signal for each of the plurality of applications; and
    a predictor engine to:
    analyze the monitored usage of the plurality of applications over the first time period;
    predict usage of the one application by the user during a second time period after the first time period based on the analyzed monitored usage of the plurality of applications during the first time period; and
    generate existing content of the one application during the second time period based on the predicated usage of the plurality of applications during the first time period.

2. The system of claim 1, wherein the monitor engine triggers an initiation of the heartbeat event at a specified time interval to determine the usage of the plurality of applications.

3. The system of claim 1, wherein the monitor engine triggers an initiation of the heartbeat event in response to determining a new activity by at least one of an existing user and a new user.

4. The system of claim 1, wherein the predictor engine is to analyze additional monitored usage including the generated content and generate additional content based on the additional monitored usage including the generated content.

5. The system of claim 1, wherein the plurality of applications in a device is used by a user.

6. The system of claim 1, wherein the monitor engine generates a usage log at a start of the first time period.

7. The system of claim 1, wherein the predictor engine generates a suggestion for an alternate application based on the analysis of the monitored usage.

8. A non-transitory machine-readable medium storing instructions executable by a processor to:
    monitor usage of a plurality of applications used by a user during a series of heartbeat events each having a predetermined time interval that occur during a first time period based on a frequency of signal generated by the plurality of applications;
    analyze the monitored usage of the plurality of applications;
    determine a frequency of signal generated by the monitored usage of the plurality of applications wherein the frequency of signal comprises a number of occurrences and time of usage for each application during the first time period, and is measured in proportion to the number of applications being monitored;
    generate information to elect one application over another application based on the frequency of signal for each of the plurality of applications;
    predict usage of the one application by the user during a second time period based on the frequency of signal; and
    generate existing content of the one application during the second time period based on the predicated usage of the plurality of applications during the first time period.

9. The medium of claim 8, comprising instructions executable by the processor to generate existing content in the second time period, wherein the existing content comprises at least one of images or text associated with at least one of the plurality of applications, an additional application, and an application providing similar functionality to at least one of the plurality of applications.

10. The medium of claim 8, comprising instructions executable by the processor to verify the user of the first time period, via an authentication process, to predict usage of the plurality of applications by the user during the second time period.

11. The medium of claim 8, comprising instructions executable by the processor to determine usage of the plurality of applications based on a set of determined criteria.

12. A method, comprising:
    monitoring usage of a plurality of applications by a user during a series of heartbeat events each having a predetermined time interval that occur during a first time period;
    analyzing usage during the first time period;
    determining a frequency of signal generated by the monitored usage of the plurality of applications wherein the frequency of signal comprises a number of occurrences and time of usage for each application during the first time period, and is measured in proportion to the number of applications being monitored;
    generating information to elect one application over another application based on the frequency of signal for each of the plurality of applications;
    predicting future usage of the one application plurality of applications by the user during a second time period after the first time period based on the analysis of usage; and
    displaying existing content of the one application on a display during a second time period based on the predicted future usage of the plurality of the applications.

13. The method of claim 12, wherein predicting the future usage of the plurality of applications comprises analyzing contextual information including at least one of a date, a time, a duration of usage, and combinations thereof.

14. The method of claim 12, further comprising disposing content during the second time period based on the predicted future usage of the plurality of the applications.

\* \* \* \* \*